H. C. WRIGHT.
ATTACHMENT FOR DRILL PRESSES.
APPLICATION FILED SEPT. 19, 1912.
1,065,574.
Patented June 24, 1913.
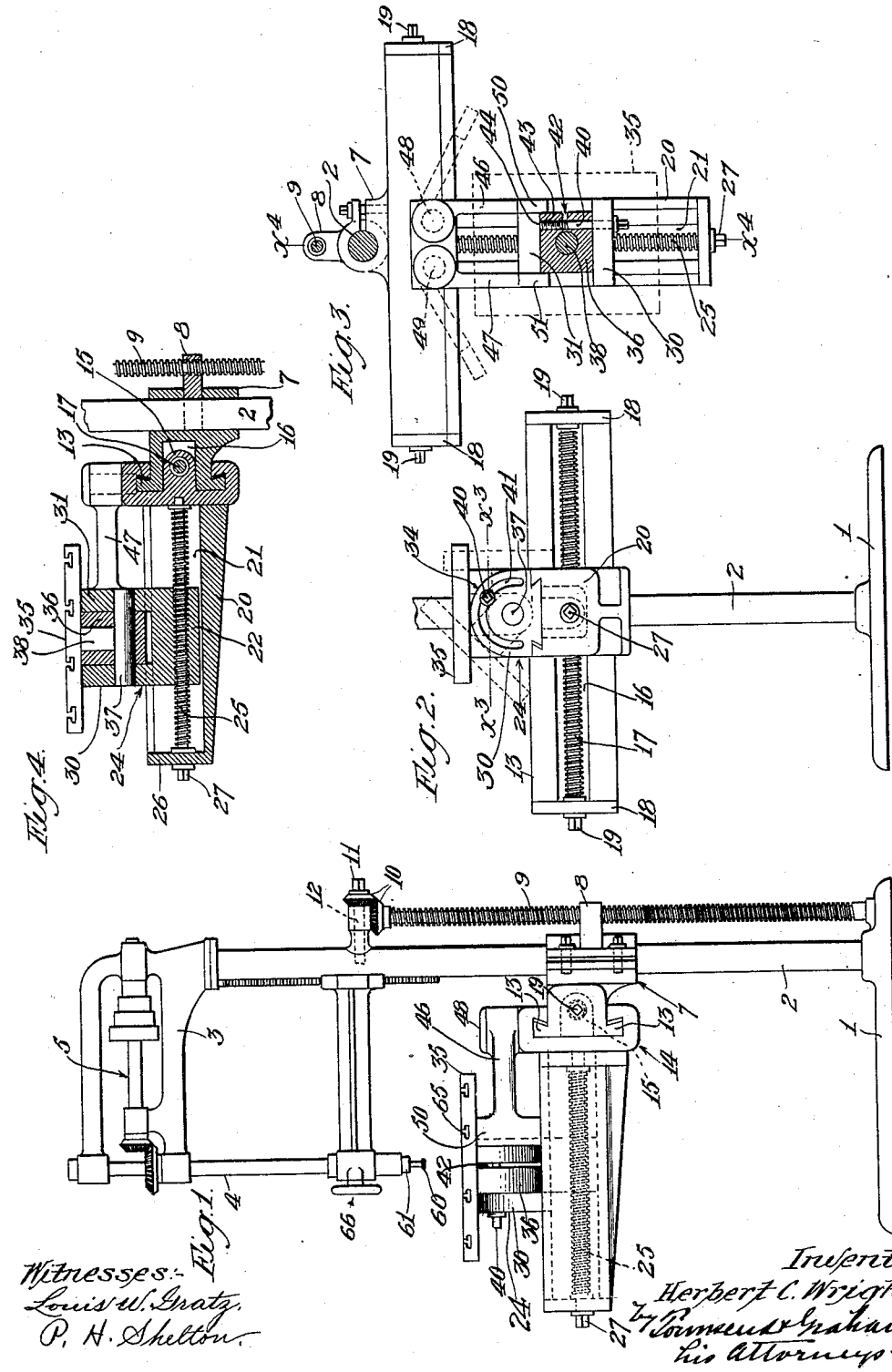

UNITED STATES PATENT OFFICE.

HERBERT C. WRIGHT, OF LOS ANGELES, CALIFORNIA.

ATTACHMENT FOR DRILL-PRESSES.

1,065,574. Specification of Letters Patent. Patented June 24, 1913.

Application filed September 19, 1912. Serial No. 721,311.

*To all whom it may concern:*

Be it known that I, HERBERT C. WRIGHT, a subject of the King of the United Kingdom of Great Britain and Ireland, having declared my intention of becoming a citizen of the United States, residing at Los Angeles, in the county of Los Angeles and State of California, have invented a new and useful Attachment for Drill-Presses, of which the following is a specification.

My invention relates to an attachment for drill presses, being more particularly an adjustable table, and one of the main objects of my invention is to produce an attachment of the character described consisting of an adjustable table for holding the work thereon, which table may be adjusted so that the face of the table assumes different desired angles, so that the handling of the work may be facilitated.

Other objects and advantages will appear hereinafter from the following specification.

Referring to the drawings, which are for illustrative purposes only: Figure 1 is a side elevation of a drill press having attached thereto a table embodying a form of my invention. Fig. 2 is a front elevation of the table and carrying means therefor. Fig. 3 is a sectional plan view on line $x^3$—$x^3$ Fig. 2. Fig. 4 is a vertical sectional view on line $x^4$—$x^4$ Fig. 3.

The drill press consists of a base 1 upon which is mounted a vertical standard 2, upon the upper end of which is the head 3 which carries a drill spindle 4 and driving mechanism 5 therefor. Slidably mounted on the standard 2 is a carrier 7 provided with an interiorly threaded extension 8 which is engaged by a vertical feed screw 9 by means of which the vertical position of the carrier 7 on the standard 2 may be adjusted. The feed screw 9 is driven through bevel gears 10 from a square head 11 on a shaft 12, which head 11 is adapted to be engaged by any suitable wrench. The carrier 7 is provided with a pair of ways 13 upon which is mounted a longitudinally movable carriage 14, the carriage 14 being provided with an interiorly threaded lug 15 which extends into a longitudinal slot 16 in the carrier 7 wherein the lug 15 is engaged by a longitudinally disposed feed screw 17. The feed screw 17 extends through the ends 18 of the carrier 7 and terminates at each end in square heads 19 adapted to be engaged by any suitable wrench, so that the longitudinal position of the carriage 14 with relation to the drill spindle may be varied as desired.

Extending forwardly from the carriage 14 is an arm or extension 20 having a slot 21 formed in the upper face thereof into which extends an interiorly threaded lug or nut 22 of a transversely movable carriage 24, which nut 22 is engaged by means of a transversely disposed feed screw 25, the inner end of which is mounted in the carriage 14 and the outer end of which extends through the outer end 26 of the arm 20 and terminates in a square head 27 adapted to be engaged by any suitable wrench, so that the feed screw 25 may be operated to move the carrier 24 to vary the position of the same in relation to the drill spindle 4.

The carriage 24 consists of a front member 30 and a rear member 31, the upper ends of which are rounded, as indicated at 34, upon which rests the table 35. The table 35 is provided with a block 36 into which extends a stud 38 secured to the table, which block 36 extends downwardly between the front and rear members 30 and 31 respectively of the carriage 24 and is pivotally mounted on the carriage by means of a pin 37 mounted in the front and rear members 30 and 31 respectively of the carriage and extending through the block 36 of the table, which construction permits the table 35 to be swung on the curved faces 34 of the members 30 and 31 about the pin 37 as a center.

Means are provided for securing the table 35 in any desired position on the pin 37, which means consists of a bolt 40 which extends through a slot 41 in the member 30, thence through one side of the block 36 which is slotted, as indicated at 42, the inner end of the bolt 40 engaging threads 43 at the inner end of a bolt hole 44 in the block 36, and when tightened clamps the split portion of the block 36 on the stud 38, thereby preventing rotary movement of the stud 38 within the block 36 and also preventing the swinging movement of the table on the pin 37 as the head of the bolt is tight against the outer face of the member 30 of the carriage 24.

When the table is in the horizontal position shown in full lines in Figs. 1, 2 and 4, which is the position in which the table is ordinarily used for a great variety of the work performed thereon, means are provided for steadying the table in such position, which means consists of two arms 46 and 47 pivotally mounted at their inner ends on studs 48 and 49 respectively, the outer ends of the arms 46 and 47 being provided with heads 50 and 51 respectively, the upper faces of which engage the under side of the table 35 and the lower faces of which rest upon the arm 20. It is understood that when the table is tilted to any position out of the horizontal, that the arms 46 and 47 may be swung outwardly into the position shown in dotted lines in Fig. 3, in which position the arms are clear of the table. The table in the position shown in full lines in the drawing is centrally disposed with relation to the drill spindle, in which position the tool 60 in the socket 61 of the drill spindle would strike the center of the table.

With a table constructed and mounted as above described, the transverse position of the table with relation to the standard of the drill press may be varied by operating the feed screw 25 in the manner heretofore described, and the longitudinal position of the table may be varied by operating the feed screw 17 in the manner heretofore described. The angle of the table may be changed by tilting the table which is accomplished by loosening the bolt 40 and swinging the table on the pin 37 to the desired position, after which the bolt 40 is tightened. The table may also be rotated on the block 36 upon the stud 38 which extends into the block 36 upon loosening the bolt 40. By utilizing the various adjustments hereinabove pointed out, it is readily seen that work may be placed upon the table and various operations performed without unclamping the work from the table, but simply by moving the table to bring the work thereon into the desired relation with the drill spindle by the movements heretofore described.

Any of the well known forms of devices may be used for fixing the work to the drill table, and while I have shown a series of T-slots, indicated at 65, in the table, it is understood that any well known means for securing the work to the table may be employed. It is further understood that the operation of driving the drill spindle is performed in the usual manner and that the tool is raised and lowered by any suitable mechanism indicated at 66, and that various forms of tools, such as drills or end milling tools, may be used in the drill spindle.

What I claim is:—

1. An attachment for drill presses comprising a standard, a carrier slidably mounted on said standard, a longitudinally movable carriage mounted on said carrier, a transversely movable carriage mounted on said first named carriage, a table rotatably mounted on said transversely movable carriage, means for tilting said table on said carriage, and a single locking means for fixing said table against tilting and rotating.

2. An attachment for drill presses comprising a standard, a carrier in fixed horizontal relation to and vertically slidable on said standard, a longitudinally movable carriage mounted on said carrier, a transversely movable carriage mounted on said first named carriage, a table rotatably mounted on said transversely movable carriage, and means for tilting said table on said last named carriage.

3. An attachment for drill presses comprising a standard, a carrier slidably mounted on said standard, a longitudinally movable carriage mounted on said carrier, a transversely movable carriage mounted on said first named carriage, a table on said transversely movable carriage, means for tilting said table on said transversely movable carrier, and means for bracing said table in horizontal position, said bracing means consisting of a pair of levers pivotally mounted on said longitudinally movable carriage adapted to swing under and engage the underside of said table.

4. An attachment for drill presses comprising a standard, a carrier slidably mounted on said standard, a longitudinally movable carriage on said carrier, a stationary arm extending forwardly from said carriage, a transversely movable carriage mounted on said arm, a block pivotally mounted in said transversely movable carrier, a table on said block, and a stud on said table extending into said block.

5. An attachment for drill presses comprising a standard, a carrier slidably mounted on said standard, a longitudinally movable carriage on said carrier, a stationary arm extending forwardly from said carriage, a transversely movable carriage mounted on said arm, a block pivotally mounted in said transversely movable carrier, a table on said block, a stud on said table extending into said block, and a single locking means for clamping said stud in said block and clamping said block in said transversely movable carriage.

6. An attachment for drill presses comprising a standard, a carrier slidably mounted on said standard, a longitudinally movable carriage on said carrier, a stationary arm extending forwardly from said carriage, a transversely movable carriage mounted on said arm, a block pivotally mounted in said transversely movable carrier, a table on said block, a stud on said table extending into said block, a single locking means for clamping said stud in said block and clamping said block in said transversely movable carriage, a pair of arms pivotally mounted on said longitudinally movable carriage, and a head on each arm adapted to rest on the stationary arm on said longitudinally movable carriage and engage the under face of said table.

In testimony whereof, I have hereunto set my hand at Los Angeles, California, this 10th day of September, 1912.

HERBERT C. WRIGHT.

In presence of—
 LOUIS W. GRATZ,
 ISABEL HALL.

Copies of this patent may be obtained for five cents each, by addressing the "Commissioner of Patents, Washington, D. C."